US009776710B2

(12) United States Patent
Duke

(10) Patent No.: US 9,776,710 B2
(45) Date of Patent: Oct. 3, 2017

(54) WINGTIP VORTEX DRAG REDUCTION METHOD USING BACKWASH CONVERGENCE

(71) Applicant: John Hincks Duke, Providence, RI (US)

(72) Inventor: John Hincks Duke, Providence, RI (US)

( * ) Notice: Subject to any disclaimer, the term of this patent is extended or adjusted under 35 U.S.C. 154(b) by 89 days.

(21) Appl. No.: 14/505,300

(22) Filed: Oct. 2, 2014

(65) Prior Publication Data

US 2016/0229527 A1   Aug. 11, 2016

Related U.S. Application Data

(60) Provisional application No. 61/886,051, filed on Oct. 2, 2013.

(51) Int. Cl.
*B64C 23/06* (2006.01)
*B64D 27/02* (2006.01)
*F03D 1/06* (2006.01)

(52) U.S. Cl.
CPC ............ *B64C 23/065* (2013.01); *B64D 27/02* (2013.01); *F03D 1/0675* (2013.01);
(Continued)

(58) Field of Classification Search
CPC ....... B64C 23/065; B64C 23/06; B64D 27/02; F03D 1/0675; F05B 2220/31
See application file for complete search history.

(56) References Cited

U.S. PATENT DOCUMENTS 2,477,461 A   7/1949  Lee
2,485,218 A   10/1949 Shaw
(Continued)

FOREIGN PATENT DOCUMENTS

DE         EP 2223853 A1 *  9/2010  ........... B64C 23/065
WO  PCT/EP2012/074376    6/2013

OTHER PUBLICATIONS

J. C. Patterson, Jr and S.G. Fletcher, "Exploratory Wind-Tunnel Investigation of a Wingtip-Mounted Vortex Turbine for Vortex Energy Recovery", NASA Technical Paper 2468 published Jun. 1985
(Continued)

*Primary Examiner* — Philip J Bonzell

(57) ABSTRACT

A fuel efficient aircraft propulsion system comprises a wingtip mounted ducted pusher fan with convergent backwash and a skewed conical engine nacelle. The system both mitigates wingtip vortex drag and converts a portion of vortex energy into propulsion force and lift force. The forward-tapering nacelle skews both downward and inward, so the lower nacelle surface is flush with the lower wing surface and the inboard nacelle surface does not alter flow over the upper wing surface. This firstly preserves lift at the outboard wing end. Secondly, air displacement by the nacelle accelerates flow only on the outboard and upper nacelle surfaces, and because the nacelle occupies the core of the nascent wingtip vortex, rotational air velocity is greatest on the upper nacelle surface. The resultant pressure drop on the upper nacelle surface contributes to aircraft lift. And because the nacelle surface tapers forward, this pressure drop does not exert backward-acting drag on the aircraft. Aft of the nacelle, the pusher fan hub surface conforms with the aft nacelle surface and tapers aft. Propulsion foils project from the forward portion of the pusher fan hub at an outward-aft angle, which directs convergent high pressure backwash flow along the aft tapering hub surface. This isolates aft-facing hub surfaces from drag-inducing vortex core pressure drop. Downstream fan backwash convergence then forms a central volume of high pressure flow where the low pressure trailing vortex core would otherwise develop. This is an efficient means to dissipate the cyclonic structure of the vortex, because vortex persistence requires low pres-
(Continued)

sure core persistence. The direction of pusher fan rotation opposes the direction of wingtip vortex rotation as described in the prior art. This cross-flow interaction increases the effective power of the fan and also further counters vortex formation. An integral peripheral duct links the outer ends of the fan propulsion foils to provide thrust efficiency similar to that of a high bypass fanjet engine, but without the internal air friction within a bypass channel. In an alternative horizontal axis wind turbine embodiment, the same nacelle form supports secondary power-takeoff turbines mounted in high energy density flow at the turbine blade tips.

17 Claims, 7 Drawing Sheets

(52) U.S. Cl.
CPC ......... *F05B 2220/31* (2013.01); *Y02E 10/721* (2013.01); *Y02E 10/726* (2013.01)

(56) References Cited

U.S. PATENT DOCUMENTS

| | | | |
|---|---|---|---|
| 3,596,854 A | 8/1971 | Haney | |
| 3,997,132 A | 12/1976 | Erwin | |
| 4,045,144 A | 8/1977 | Loth | |
| 4,105,362 A | 8/1978 | Sforza | |
| 4,428,711 A | 1/1984 | Archer | |
| 4,533,101 A * | 8/1985 | Patterson, Jr. | B64C 23/065 244/199.3 |
| 4,917,332 A * | 4/1990 | Patterson, Jr. | B64C 23/065 244/199.3 |
| 5,100,085 A | 3/1992 | Rubbert | |
| 5,150,859 A | 9/1992 | Ransick | |
| 5,297,764 A * | 3/1994 | Haney | B64C 23/065 244/199.3 |
| 5,702,071 A | 12/1997 | Kroll | |
| 5,918,835 A | 7/1999 | Gerhardt | |
| 5,934,612 A | 8/1999 | Gerhardt | |
| 7,131,812 B2 | 11/2006 | Brueckner | |
| 7,270,214 B1 * | 9/2007 | Tonnessen | G01V 1/3826 114/244 |
| 7,900,876 B2 | 3/2011 | Eberhardt | |
| 8,421,260 B2 | 4/2013 | Duke | |

OTHER PUBLICATIONS

W. K. Abeyounis, J. C. Patterson, Jr, H. P. Stough, III, A. J. Wunschel, and P. D. Curran, "Wingtip Vortex Turbine Investigation", SAE Technical Paper Series #901936, AEROTECH '90, Long Beach, CA Oct. 1-4, 1990.

B. Sweetman, "The Short, Happy Life of the Prop-fan", Air and Space Magazine, Smithsonian, Sep. 1, 2005.

J. Duke, "Vortex Energy Recovery Turbine", U.S. Appl. No. 13/860,493, filed 3013-10-04 not yet published.

* cited by examiner

WINGTIP VORTEX DRAG REDUCTION METHOD USING BACKWASH CONVERGENCE

This application claims priority of Provisional Patent Application No. 61/886,051 entitled "High Efficiency Aircraft Propulsion System".

1. BACKGROUND OF THE INVENTION

Lift induced wingtip vortices account for 25 to 40 percent of total airframe drag on fixed-wing transport aircraft, which poses a longstanding challenge in aircraft design. Recent efforts to reduce this drag loss include distinct wingtip structure, for example U.S. Pat. No. 7,900,876 to Eberhardt describes sets of wingtip feathers with respective forward and aft sweep angles. Prior efforts to both reduce vortex drag and recover a portion of the otherwise lost vortex energy disclose the use of non-powered wingtip mounted turbines that extract energy from the vortex, for example U.S. Pat. No. 2,485,218 to Shaw, U.S. Pat. No. 4,428,711 to Archer, U.S. Pat. No. 4,917,332 to Patterson, U.S. Pat. No. 5,100,085 to Rubbert, U.S. Pat. No. 5,150,859 to Ransick, U.S. Pat. No. 5,702,071 to Curran and Kroll, U.S. Pat. No. 5,918,835 to Gerhardt, U.S. Pat. No. 5,934,612 to Gerhard, and NASA Technical Paper 2468 published June 1985 by J. C. Patterson, Jr. and S. G. Fletcher, "Exploratory Wind-Tunnel Investigation of a wingtip-Mounted Vortex Turbine for Vortex Energy Recovery". Also see U.S. Pat. No. 3,596,854 to Haney and U.S. Pat. No. 2,477,461 to Lee. In the related field of wind energy conversion, means to convert induced vortex energy from non-rotating structures is disclosed in U.S. Pat. No. 4,045,144 to Loth, U.S. Pat. No. 4,105,362 to Sforza, and U.S. Pat. No. 7,131,812 to Brueckner.

The prior art also describes the use of powered wingtip devices that both provide propulsion and dissipate vortex drag. For example, U.S. Pat. No. 3,997,132 to Erwin describes supplemental wingtip mounted jet engines with controllable fins that swirl their exhaust streams in opposition to the vortices. U.S. Pat. No. 4,533,101 to Patterson discloses a pusher type propeller with radial blades mounted downstream of the wing tips, where the propellers rotate in opposition to the vortices. Vortex cross-flow thereby increases relative airspeed through the propellers and turns the resultant lift vectors upstream. This both increases propulsive force and weakens the vortex, and downstream injection of the propeller wake into the vortex further weakens the vortex. Lastly, patent application PCT/EP2012/074376 by Lopez and Schneider describes wingtip propellers deployed within wingtip slots.

The present invention employs a wingtip mounted pusher type fan for primary propulsion, which turns in opposition to the vortex rotation direction following Patterson in U.S. Pat. No. 4,533,101. Here the improvement in propulsion efficiency comprises a novel wingtip nacelle form and a novel pusher fan design. The pusher fan is distinct from Patterson because its outward-aft blade sweep angle directs convergent backwash to a central high pressure flow volume that more efficiently dissipates the cyclonic structure of the vortex.

In an alternative horizontal axis wind turbine embodiment, the same nacelle form supports secondary power-takeoff turbines mounted in high energy density flow at the turbine blade tips. In this arrangement, the secondary turbines turn in the same direction as the lift induced vortices. This reduces blade tip vortex drag and directly generates additional electrical power. The same embodiment is adaptable to large scale power generation from tidal, river, and ocean currents.

The primary purpose of the present invention is to improve the efficiency of energy expenditure in powered flight. The secondary purpose is to dissipate vortices that trail wingtips of large aircraft to reduce wake turbulence that is hazardous to other aircraft. In the alternative embodiment, the primary purpose is to improve the efficiency of fluid kinetic energy capture.

2. BRIEF DESCRIPTION OF THE FIGURES

3. SPECIFICATION

Figure 1:
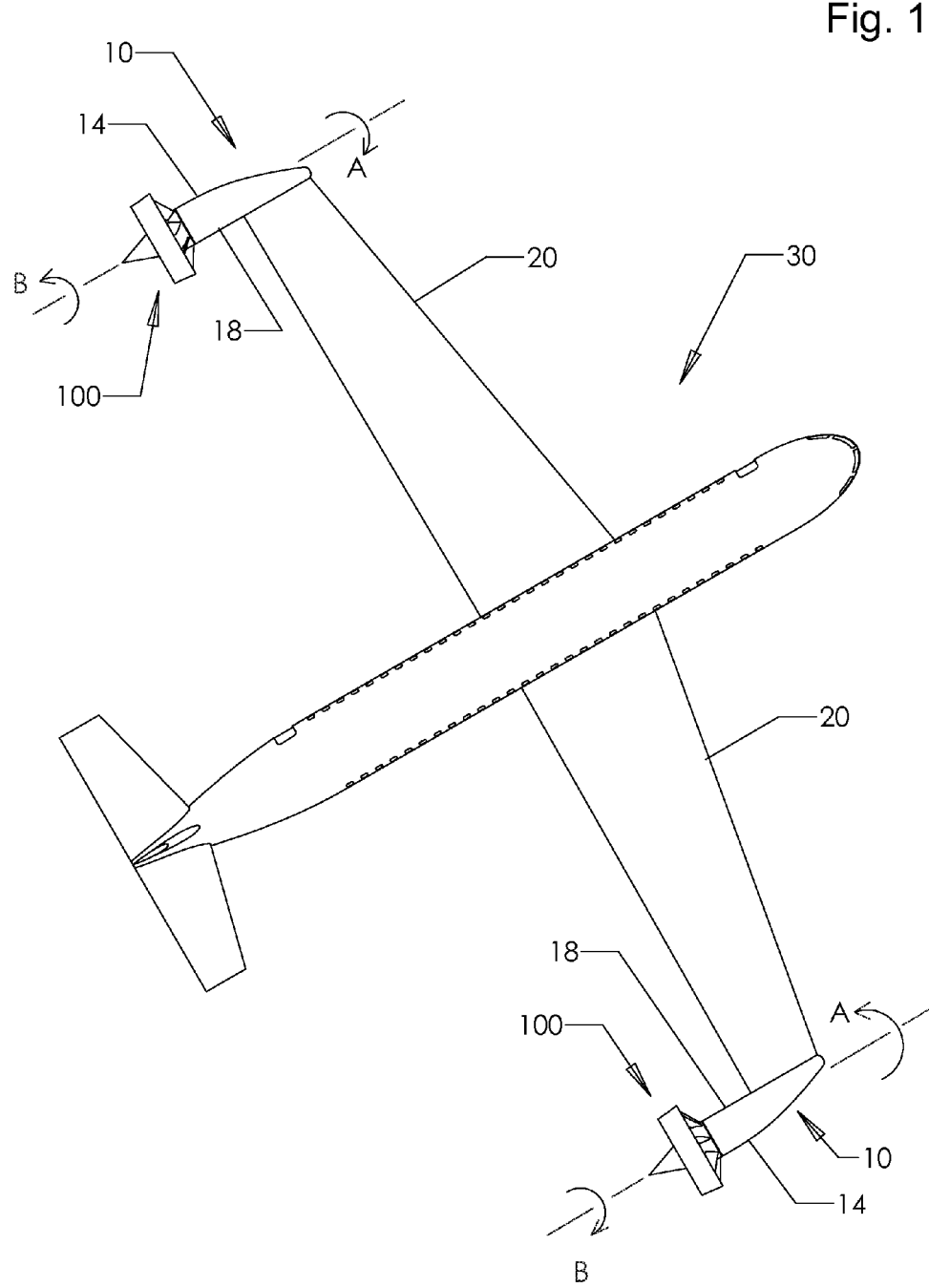
FIG. 1 is a downward looking view with an aircraft design in the prior art for context.

In FIG. 1, a pair of wingtip nacelles 10 connect to the outboard ends of a pair of wings 20 that produce upward lift force to support an aircraft 30. Aircraft 30 has a forward end and an aft end which define a longitudinal direction. A rotation direction A indicates the direction of rotation and approximate axis of rotation of the wingtip vortices that wings 20 generate when aircraft 30 moves forward. The surfaces of nacelles 10 have an outboard nacelle portion 14 and an inboard nacelle portion 18. A pair of fans 100 rotatably connect to the aft end of nacelles 10 and are driven by rotary engines within nacelles 10 not shown. To propel aircraft 30 in its forward direction, fans 100 rotate in a direction B that is opposite direction A. The axis of fan 100 rotation is substantially co-axial with the lift induced wingtip vortex that forms at the outboard end of each wing 20 when aircraft 30 moves forward.

Figure 2:
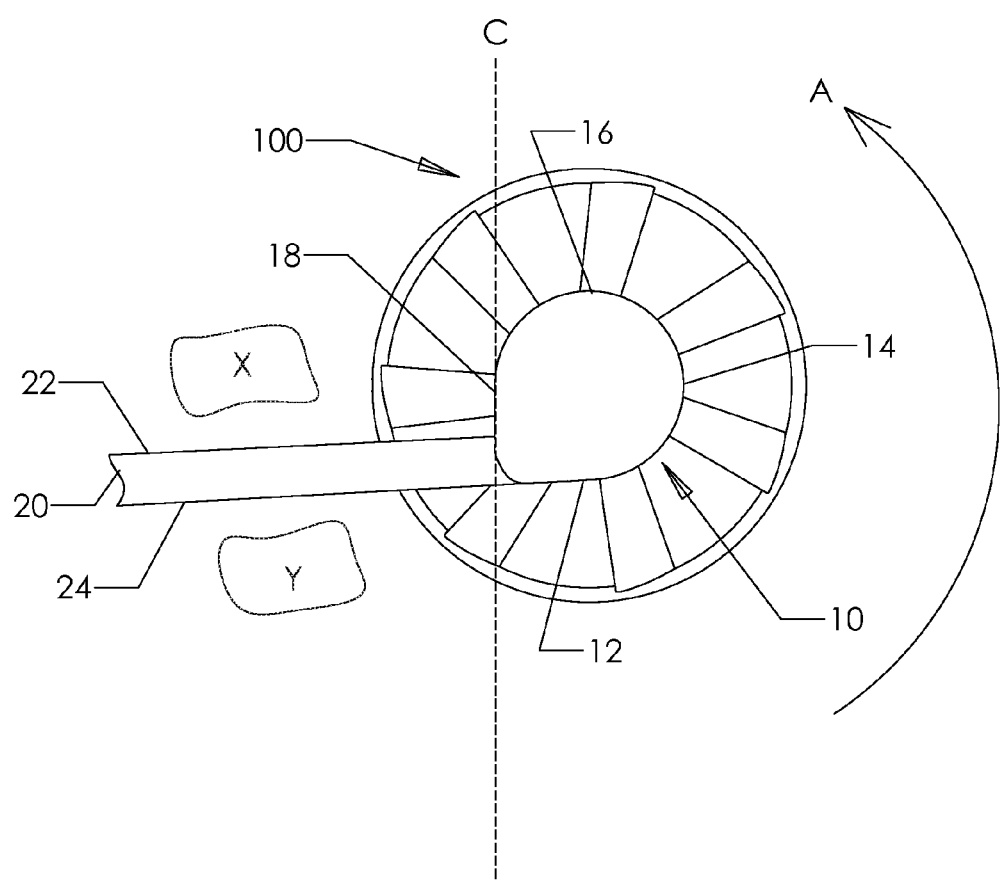
FIG. 2 is an aft facing view of the wing tip portion.

The aft facing detail view in FIG. 2 further shows a low pressure surface 22 of wing 20, a high pressure surface 24 of wing 20, a lower nacelle portion 12, and an upper nacelle portion 16. A vertical longitudinal plane C, shown in profile, is substantially tangent to inboard nacelle portion 18. A low pressure air flow volume X contacts low pressure surface 22 and inboard nacelle portion 18. A high pressure air flow volume Y contacts high pressure surface 24 and lower nacelle portion 12.

Figure 3A:
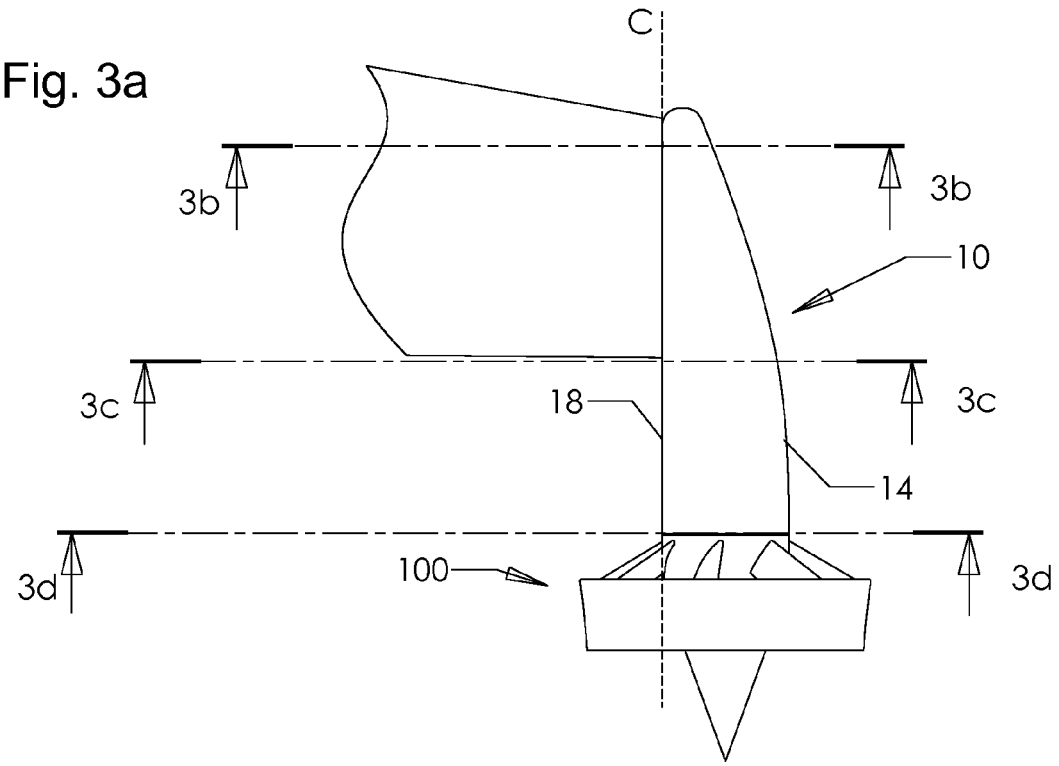
FIG. 3a is a downward looking view of the wing tip portion that shows the location of three transverse sections projected in FIGS. 3b, 3c, and 3d.

FIG. 3a further shows the location of a forward transverse section plane 3b in the forward portion of nacelle 10, an intermediate transverse section plane 3c in the central portion of nacelle 10, and an aft transverse section plane 3d at the aft end of nacelle 10.

Figure 3B:
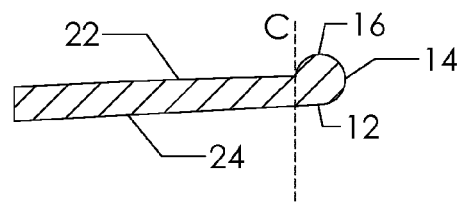

FIG. 3b further shows section 3b, where the body of nacelle 10 merges with the body of wing 20, the projection of nacelle portions 14 and 16 have a radius of curvature less than at section 3c, high pressure surface 24 is approximately tangent to lower nacelle portion 12, and the circular extension of the arc of outboard nacelle portions 14 and 16 is approximately tangent to plane C.

Figure 3C:
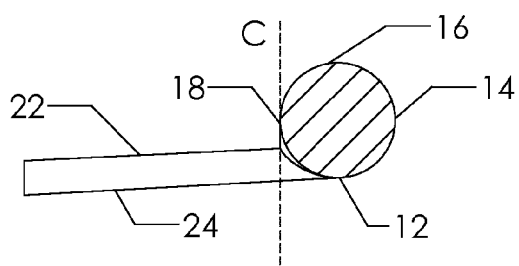

FIG. 3c further shows section 3c, where the cross-section of nacelle 10 is approximately circular, the transverse area of nacelle 10 is less than in section 3d, high pressure surface 24 is approximately tangent to lower nacelle portion 12, and inboard nacelle portion 18 is approximately tangent to plane C.

Figure 3D:
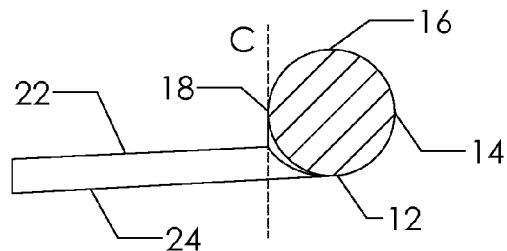

FIG. 3d further shows section 3d, where the cross-section of nacelle 10 is approximately circular, the cross-section of nacelle 10 projects its maximum area, high pressure surface 24 is approximately tangent to lower nacelle portion 12, and inboard nacelle portion 18 is approximately tangent to plane C.

Collectively, FIGS. 3b, 3c, and 3d show that the form of nacelle 10 is a skewed circular cone that curves both inboard, so that inboard nacelle surface 18 is continuously approximately tangent to plane C, and downward, so that lower nacelle portion 12 is continuously approximately tangent to high pressure surface 24. The orientation of the entire surface of nacelle 10 that is forward of section 3d is such that the longitudinal component of all exterior normal vectors is positive forward.

Because the cross-sections of nacelle 10 are approximately circular, the geometric distinctions between nacelle portions 12, 14, 16, and 18 are progressive.

In the preferred embodiment, the cross-section diameter of nacelle 10 at section 3d is greater than twice the maximum distance between low pressure surface 22 and high pressure surface 24 where nacelle 10 connects to wing 20. In the preferred embodiment, the longitudinal distance between the aft edge of wing 20 and the aft end of nacelle 10 is greater than the maximum diameter of nacelle 10.

Figure 4:
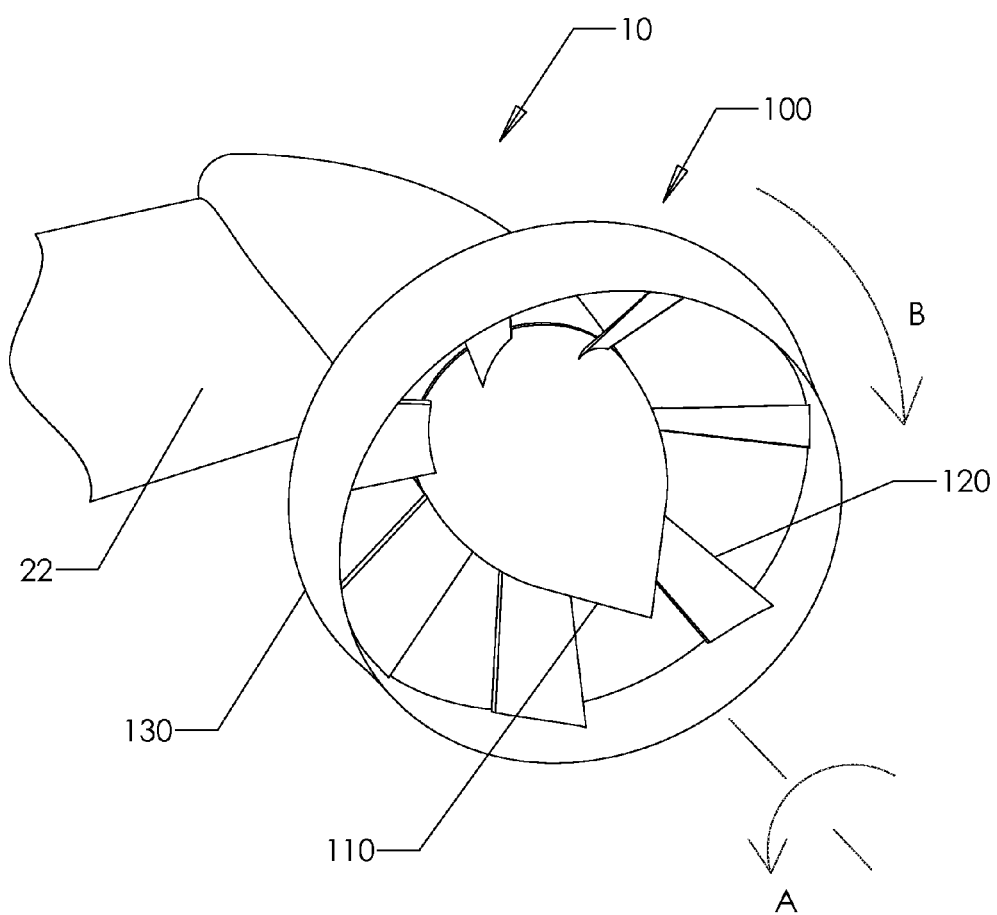
FIG. 4 is a perspective view of the wing tip portion.

FIG. 4 further shows that fan 100 comprises an aft tapering central hub 110 that supports a set of propulsion foils 120 that each connect to a peripheral duct 130. The forward outer surface of hub 110 is substantially tangent to the aft outer surface of nacelle 10.

Figure 5:
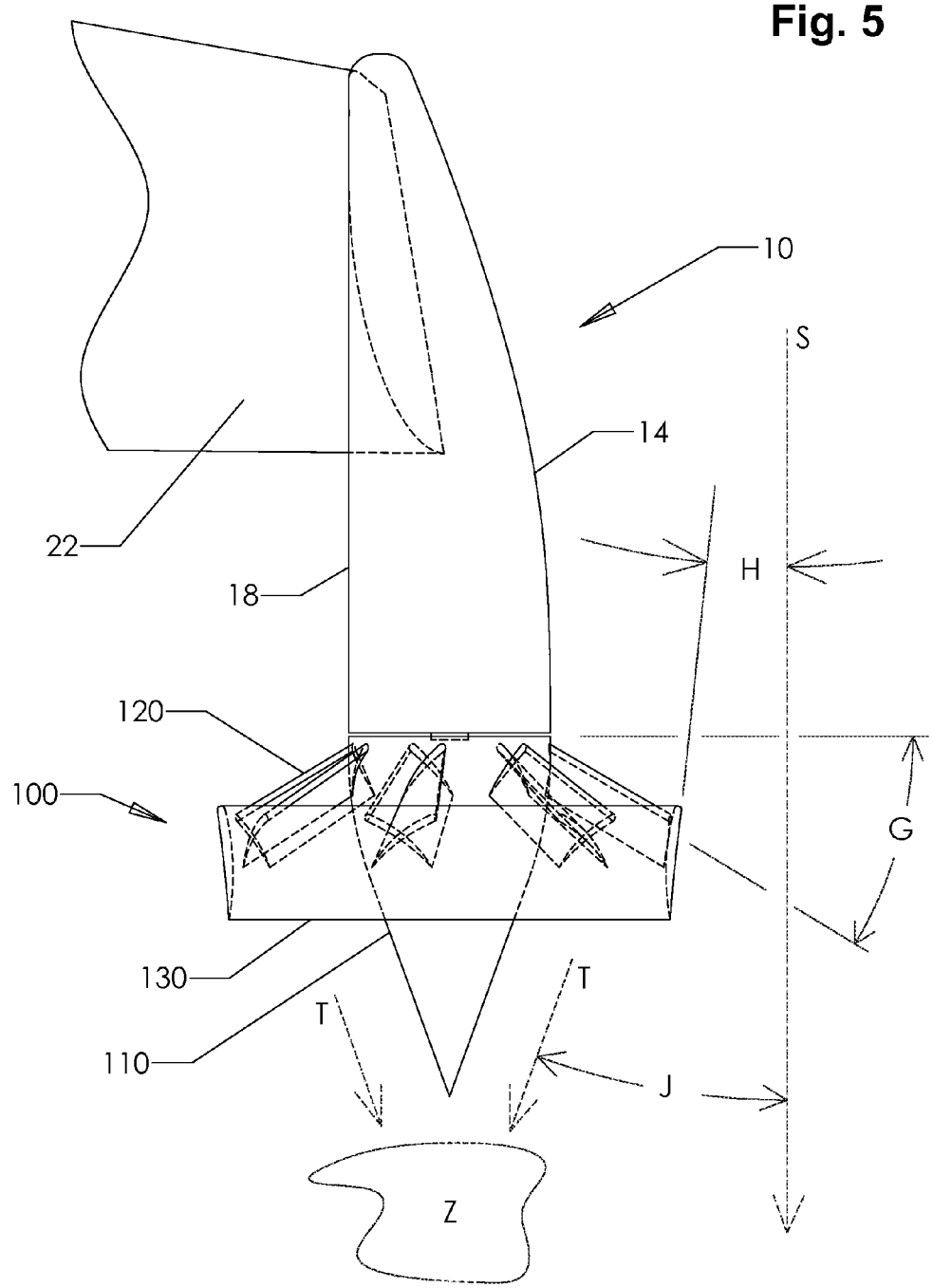
FIG. 5 is a downward looking transparent view of the wing tip portion.

The FIG. 5 transparent view with dashed hidden lines shows that the inner ends of propulsion foils 120 project outward-aft from the forward portion of hub 110 at an angle G between a transverse plane and the span axis of each propulsion foil 120. In the preferred embodiment, angle G is between 15 and 40 degrees. Radially, the high pressure surfaces of propulsion foils 120 face inward towards the axis of hub 110 rotation. Circumferentially, the high pressure surfaces of propulsion foils 120 face in the direction opposite vortex direction A. The chord of the streamlined cross-section of duct 130 tapers inward-aft at an angle H with respect to a freestream direction S. In the preferred embodiment, angle H is between 1 and 5 degrees. The orientation of foils 120 at angle G results in convergent backwash in a direction T that is at an angle J with respect to freestream direction S. The form of hub 110 also tapers at approximately angle J with respect to freestream direction S. In the preferred embodiment, angle J is between 10 and 35 degrees and less than angle G. A high pressure air volume Z indicates the location of central downstream backwash convergence.

In the preferred embodiment aircraft 30 is a commercial transport type and the rotary engines within nacelle 10 are gas turbine engines with scroll type side air inlets, as are known in the prior art, with exhaust vented through ports in hub 130 not shown. In an alternative application aircraft 30 is an autonomous type and the rotary engines within nacelle 10 are electric motors also known in the prior art.

Figure 6:
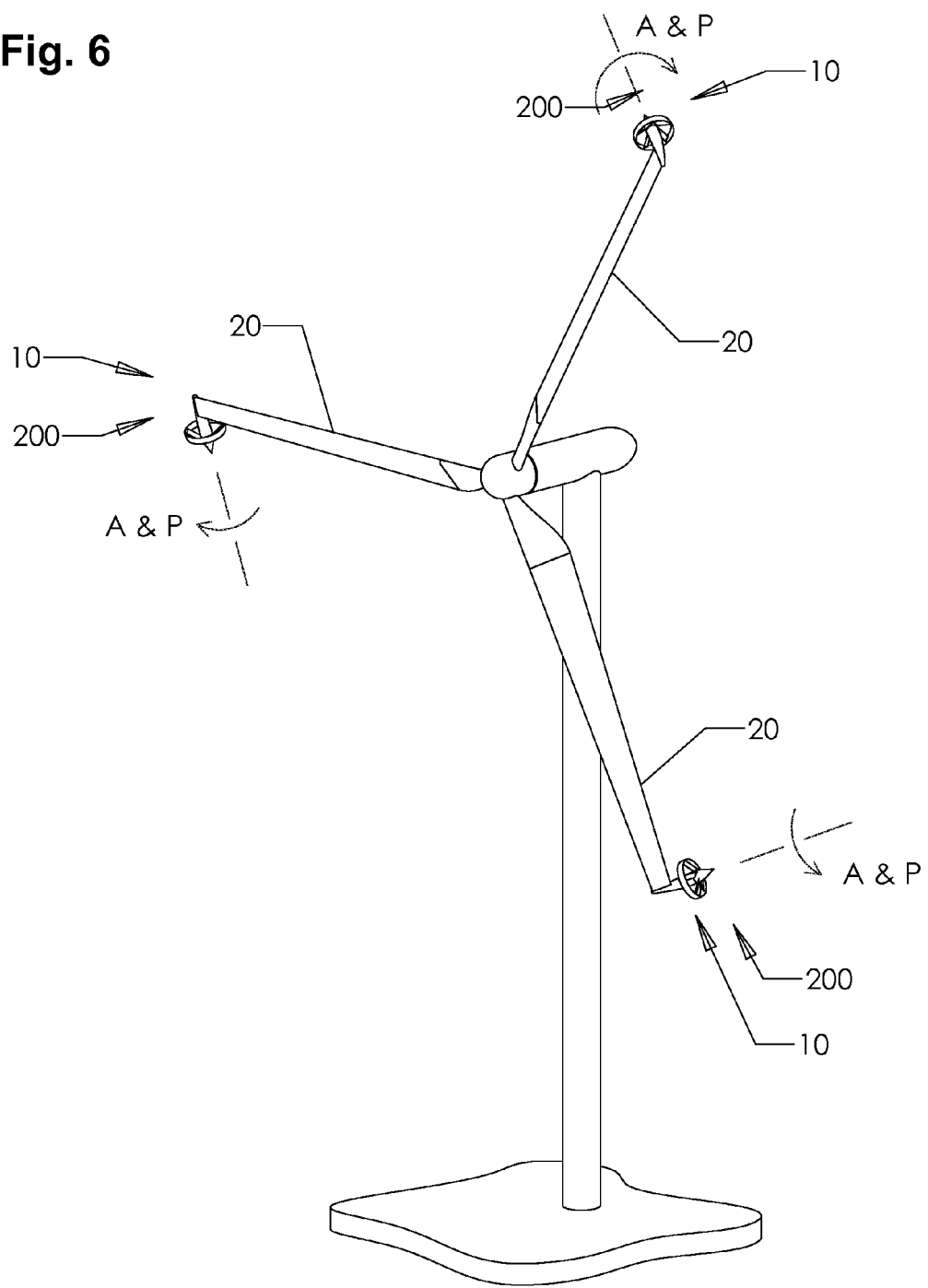
FIG. 6 is a perspective view of the alternative wind turbine embodiment.

FIG. 6 is a perspective view of an alternative wind turbine embodiment that further shows a set of secondary turbines 200 in place of fans 100. Secondary turbines 200 rotate in a direction P that is the same as vortex rotation direction A. In this embodiment, wings 20 function as the primary wind turbine blades. Nacelles 10 enclose rotary electric or hydraulic generators not shown.

Figure 7:
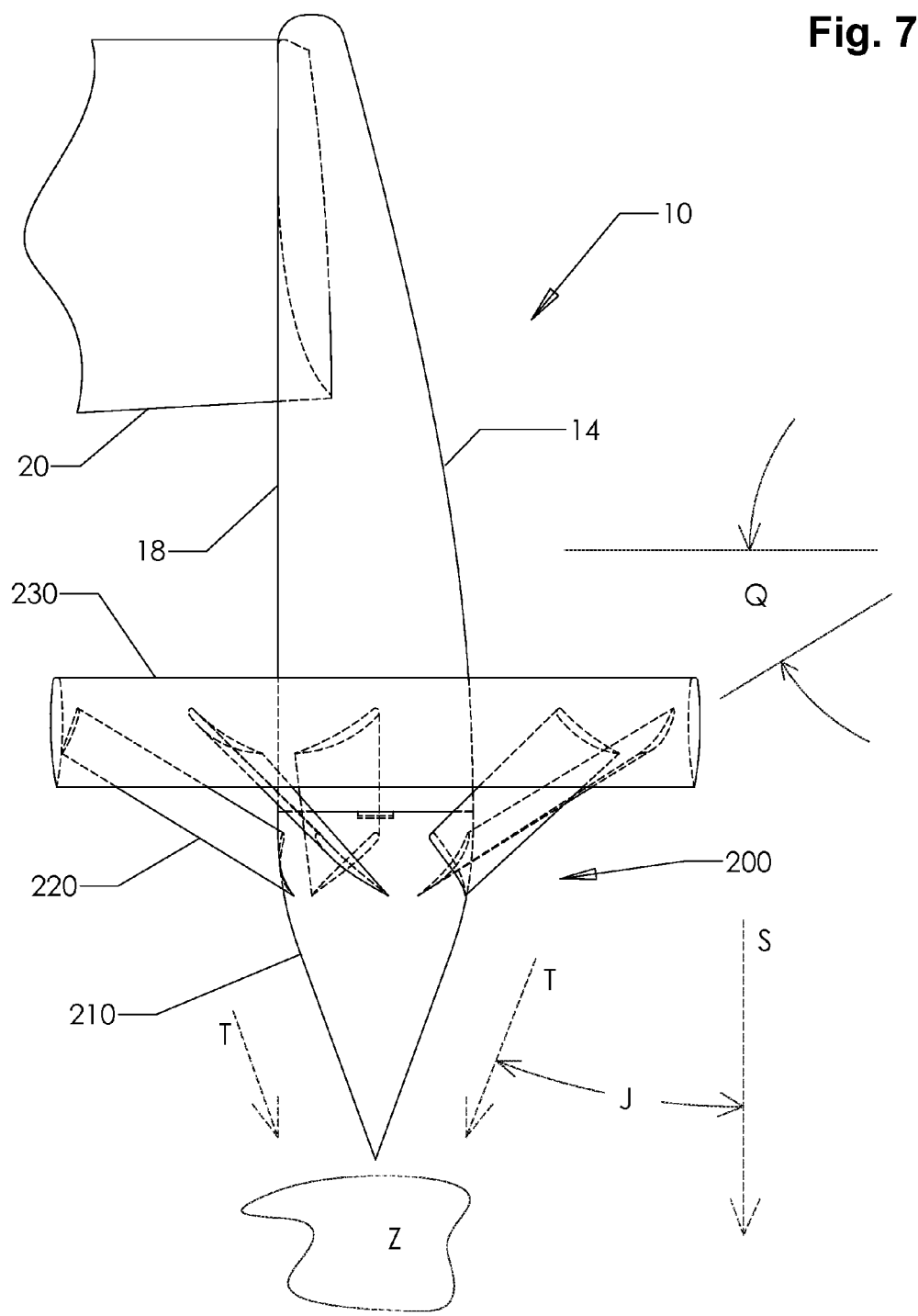
FIG. 7 is a downward looking transparent view of the wing tip portion of the alternative wind turbine embodiment.

Lastly, FIG. 7 is the transparent alternative embodiment view with dashed hidden lines analogous to FIG. 5 of the preferred embodiment. Secondary turbine 200 comprises an aft tapering central hub 210 that supports a set of power takeoff foils 220 that each connect to a peripheral duct 230. The forward outer surface of hub 210 is substantially tangent to the aft outer surface of nacelle 10. The inner ends of power takeoff foils 220 project outward-forward from the forward portion of hub 230 at an angle Q between a transverse plane and the span axis of each power takeoff foil 220. In the alternative embodiment, angle Q is between 15 and 40 degrees. Radially, the high pressure surfaces of power takeoff foils 220 face inward towards the axis of hub 210 rotation. Circumferentially, the high pressure surfaces of power takeoff foils 220 face in the direction opposite vortex direction A. The orientation of power takeoff foils 220 at angle Q results in convergent reaction flow in direction T that is at angle J with respect to freestream direction S. The form of hub 210 also tapers at approximately angle J with respect to freestream direction S.

4. OPERATION

In flight, air flow above low pressure surface 22 is substantially parallel to plane C through volume X. Because nacelle portion 18 is also parallel to plane C, the body of nacelle 10 does not disturb air flow in volume X, which preserves airfoil lift effect on low pressure surface 22. Instead, displacement of freestream flow is by nacelle portions 14 and 16. This causes an increase in local airspeed in contact with nacelle portions 14 and 16 due to conservation of mass.

The difference between air pressure in volume X and air pressure in volume Y initiates rotational movement of some fraction of volume Y air in direction A around nacelle 10. This is the known phenomenon of lift induced vortex formation. Surface tangency between high pressure surface 24 and lower nacelle portion 12 facilitates initiation of the vortex. Superposition of this rotational flow with the above displaced freestream flow causes a further increase in local airspeed in contact with nacelle portions 14 and 16.

The resultant increase in local airspeed in contact with nacelle portions 14 and 16, from both freestream displacement and vortex formation, causes a Bernoulli effect decrease in local air pressure upon nacelle portions 14 and 16.

Vortex formation around nacelle portions 14 and 16 results in a further pressure drop in contact with nacelle portions 14 and 16 due to low pressure vortex core development.

Because the transverse projections of nacelle portions 14 and 16 face forward, the above decrease in fluid pressure in contact with nacelle portions 14 and 16 does not exert rearward suction drag force on nacelle 10.

Because the longitudinal projection of upper nacelle portion 16 faces upwards, the above pressure drop in contact with upper nacelle portion 16 augments aerodynamic lift force on aircraft 30. In contrast, the form of nacelle 10 is such that there is less decrease in fluid pressure in contact with the opposite lower nacelle portion 12, so the whole nacelle 10 is a lift generating body.

The skewed cone form of nacelle 10 improves aerodynamic efficiency in both the preferred aircraft embodiment and the alternative wind turbine embodiment, by firstly preserving lift on low pressure surface 22, and secondly by forcing flow acceleration and vortex formation on the forward and upward facing surfaces of nacelle portions 14 and 16.

As is known in the prior art, energy transfer between a flow and a foil causes an angular acceleration in the flow that is away from the high pressure surface of the foil, for example downwash below a fixed wing in level flight. The force that angularly accelerates the mass of fluid is equal to and opposite the reaction force acting on the foil, by Newton's Third Law. In the preferred aircraft embodiment, where propulsion foil 120 is engine driven, the reaction force is propulsion. In the alternative wind turbine embodiment, where power takeoff foil 220 is flow driven, the reaction force drives the generator. But in both embodiments, the resultant direction of angular flow acceleration is radially and circumferentially similar. The radial component of the angular flow acceleration is inward in both embodiments, because their respective high pressure surfaces both face radially inward. The circumferential component of the angular flow acceleration is opposite the vortex direction A in both embodiments, because the circumferential direction away from their respective high pressure surfaces is opposite vortex direction A. The distinction between the two embodiments is in the axial component of angular flow acceleration, which is aft in the preferred aircraft embodiment and forward in the alternative wind turbine embodiment.

In the preferred aircraft embodiment, the outward-aft angle G of foils 120 angularly accelerates fan 100 backwash to converge radially at angle J in direction T to high pressure volume Z. A first benefit of this flow deflection is that fan 100 backwash, which has high pressure, envelops an aft facing surface of hub 110. This high pressure envelop insulates that surface from low pressure vortex core air that would otherwise exert a suction drag force upon it. A second benefit is that the subsequent high pressure backwash injection into high pressure volume Z partially dissipates the trailing vortex farther downstream, because persistence of the cyclonic structure of a vortex requires persistence of its low pressure core. The benefits of inward angular flow acceleration in the alternative wind turbine embodiment are similar but weaker because flow exiting fan 200 is lower in pressure than flow exiting fan 100.

Circumferentially, angular flow acceleration opposing vortex direction A also dissipates vortex energy by slowing the vortex. This cross-flow interaction, as described in the prior art, has a secondary benefit in increased fan 100 thrust power, because the relative flow velocity with respect to foils 120 is increased. In the alternative wind turbine embodiment, where fan 200 rotates in vortex direction A, the secondary benefit is direct conversion of vortex energy to generator shaft power, where the lift vectors from power takeoff foils 220 are more circumferential.

The inward-aft taper of duct 130 at angle H aligns the chord of duct 130 with the convergent streamlines of flow entering the interior volume of fan 100. Duct 130 improves efficiency by preventing vortex shedding at the outer ends of propulsion foils 120. This function is analogous to the cowling in a high bypass fanjet engine, but without internal friction in a bypass channel. Given the angle G outward-aft sweep angle of propulsion foils 120, duct 130 also provides circumferential hoop support against engine thrust-induced foil 120 deflection. Additionally, the integral construction of fan 100 provides resiliency and mutual outer end support of individual propulsion foils 120 subject to bird strike.

In the alternative wind turbine embodiment duct 230 improves efficiency by preventing vortex shedding at the outer ends of power takeoff foils 220. Given the angle Q outward-forward sweep angle of power takeoff foils 220, duct 130 also provides circumferential hoop support against wind-induced foil 120 deflection.

The invention claimed is:

1. A method to reduce drag force from a lift-induced vortex at a free end of a lifting foil in a stream of a fluid during recovery of energy from the vortex, the method comprising:
    displacing the fluid radially outward with respect to the rotation axis of the vortex during inception of the vortex and
    angularly accelerating the fluid in both a radial direction towards the rotation axis of the vortex and a circumferential direction opposite to the vortex rotation direction,
    where the angular acceleration is reacting to one of either a propulsion fan with a set of outward-aft swept propulsion foils or a power generating turbine with a set of outward-forward swept power takeoff foils.

2. The method of claim 1 in which said radially outward fluid displacement is in the portion of vortex rotation with a component of movement in the foil lift direction.

3. The method of claim 1 in which said angular acceleration is in reaction to propulsion.

4. The method of claim 1 where the angular acceleration is reacting to the propulsion fan with the set of outward-aft swept propulsion foils and where the method of claim 1 is performed by:
    an aircraft wing with an inboard end and an outboard end, a forward leading edge and an aft trailing edge, and an upper low pressure surface and a lower high pressure surface,
    where flight motion of the wing causes formation of the lift-induced vortex at the outboard wing end,
    where the outboard wing end body projects into a nacelle body so that the vortex forms around the nacelle,
    where the nacelle tapers forward,
    where the nacelle taper skews so a lower nacelle surface is substantially tangent to the lower high pressure wing surface,
    where the nacelle taper also skews so an inboard nacelle surface is substantially tangent to a vertical longitudinal plane,
    a rotary engine contained within the nacelle,
    a propulsion hub of the propulsion fan that rotatably connects to the aft end of the nacelle substantially co-axial with the vortex,
    where the propulsion hub tapers aft,
    where the propulsion hub is driven by the engine in a direction opposing the vortex in flight,
    where the set of propulsion foils of the propulsion fan projects from the propulsion hub,
    where each propulsion foil has a high pressure surface and a low pressure surface, and
    where the high pressure propulsion foil surfaces are pitched to face axially aft, radially inwards towards the propulsion hub rotation axis, and circumferentially opposite the direction of vortex rotation.

5. The method of claim 4 in which the aft circumferential surface of the nacelle is substantially tangent to the forward circumferential surface of the propulsion hub.

6. The method of claim 4 in which the angle between the span axes of the propulsion foils and a transverse plane is between 15 and 40 degrees.

7. The method of claim 4 in which the angle between the direction of the propulsion foils' backwash and a freestream direction is between 10 and 35 degrees.

8. The method of claim 4 further comprising a streamlined circular propulsion duct connecting to the peripheral propulsion foil ends.

9. The method of claim 8 in which the propulsion duct chord tapers inward-aft towards the propulsion hub rotation axis.

10. The method of claim 9 in which the angle between the propulsion duct chord and a freestream direction is between 1 and 5 degrees.

11. The method of claim 1 where the angular acceleration is reacting to the power generating turbine with the set of outward-forward swept power takeoff foils and where the method of claim 1 is performed by:
- a radial primary turbine blade with an axis of rotation substantially parallel to a free stream fluid flow, an inner end and an outer end, a leading edge and a trailing edge, and an upstream high pressure surface and a downstream low pressure surface,
- where power generating rotary motion of the turbine blade causes formation of the lift-induced vortex at the outer turbine blade end,
- where a forward direction is substantially into the fluid flow relative to the rotating outer turbine blade end,
- where an aft direction is opposite the forward direction,
- where the outer turbine blade end body projects into a nacelle body so that the vortex forms around the nacelle,
- where the nacelle tapers forward,
- where the nacelle taper skews so an upstream nacelle surface is substantially tangent to the primary turbine blade's high pressure surface at the primary turbine blade's outer end,
- where the nacelle has an inner surface facing towards the primary turbine blade's rotation axis,
- where the nacelle taper also skews so the inner nacelle surface is substantially tangent to a cylinder in space that is concentric with the primary turbine blade's rotation axis,
- a power takeoff hub of the power generating turbine that rotatably connects to the aft end of the nacelle substantially co-axial with the vortex,
- where the power takeoff hub tapers aft,
- where the set of power takeoff foils of the power generating turbine projects from the power takeoff hub,
- where each power takeoff foil has a high pressure surface and a low pressure surface,
- where the power takeoff foil high pressure surfaces are pitched to face axially forward on the power takeoff hub, radially inwards towards the power takeoff hub rotation axis, and circumferentially opposite the direction of vortex rotation, and
- a rotary power generator contained within the nacelle that is driven by the power takeoff hub.

12. The method of claim 11 in which the aft circumferential surface of the nacelle is substantially tangent to the forward circumferential surface of the power takeoff hub.

13. The method of claim 11 in which the angle between the span axes of the power takeoff foils and a transverse nacelle plane is between 15 and 40 degrees.

14. The method of claim 11 in which the angle between the direction of the power takeoff foils' backwash and a direction of relative flow of the fluid when the primary turbine blade is turning is between 10 and 35 degrees.

15. The method of claim 11 further comprising a streamlined circular power takeoff duct connecting to the peripheral power takeoff foil ends.

16. The method of claim 15 in which the power takeoff duct chord tapers inward-aft towards the power takeoff hub rotation axis.

17. The method of claim 16 in which the angle between the power takeoff duct chord and the power takeoff hub rotation axis is between 1 and 5 degrees.

* * * * *